US011698651B2

(12) United States Patent
Demange et al.

(10) Patent No.: US 11,698,651 B2
(45) Date of Patent: Jul. 11, 2023

(54) DEVICE AND METHOD FOR ELECTRONIC CIRCUIT POWER

(71) Applicant: STMicroelectronics (Rousset) SAS, Rousset (FR)

(72) Inventors: Nicolas Demange, Saint-Maximin la Sainte Baume (FR); Nicolas Borrel, Gardanne (FR); Jimmy Fort, Puyloubier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 7 days.

(21) Appl. No.: 17/399,674

(22) Filed: Aug. 11, 2021

(65) Prior Publication Data
US 2022/0066488 A1 Mar. 3, 2022

(30) Foreign Application Priority Data
Aug. 25, 2020 (FR) ...................................... 2008675

(51) Int. Cl.
G05F 1/56 (2006.01)
G06F 21/75 (2013.01)

(52) U.S. Cl.
CPC .............. *G05F 1/56* (2013.01); *G06F 21/755* (2017.08)

(58) Field of Classification Search
None
See application file for complete search history.

(56) References Cited

U.S. PATENT DOCUMENTS

| 4,932,053 A | 6/1990 | Fruhauf et al. |
| 6,107,868 A | 8/2000 | Diniz et al. |
| 7,227,401 B2 | 6/2007 | Zhang et al. |
| 7,372,965 B1 | 5/2008 | Wuidart |
| 7,571,492 B2 | 8/2009 | Hubert |

(Continued)

FOREIGN PATENT DOCUMENTS

| CN | 205788193 U | 12/2016 |
| CN | 106560757 A | 4/2017 |

(Continued)

OTHER PUBLICATIONS

Serrano-Gotarredona, Teresa et al., "Voltage Clamping Current Mirrors with 13-decades Gain adjustment Range Suitable for Low Power MOS/Bipolar Current Mode Signal Processing Circuits", IEEE International Symposium on Circuits and Systems, Jul. 31, 1998, 4 pages.

(Continued)

*Primary Examiner* — Thomas J. Hiltunen
(74) *Attorney, Agent, or Firm* — Slater Matsil, LLP

(57) ABSTRACT

The present invention concerns an electronic circuit power supply device, configured to: flow, through a first conductor connected to a node, a first current that is an image of a second current consumed by the electronic circuit; flow a third current through a second conductor connected to the node, a first branch of a current mirror conducting the third current; flow a fourth constant current through a third conductor connected to the node; consume a fifth current that is an image of the third current; and regulate a potential of the node by acting on a gate potential of a transistor electrically in series with a second branch of the current mirror.

20 Claims, 4 Drawing Sheets

(56) References Cited

U.S. PATENT DOCUMENTS

| | | | |
|---|---|---|---|
| 7,605,575 B2 * | 10/2009 | Leutgeb | G05F 1/573 |
| | | | 323/285 |
| 7,808,842 B1 | 10/2010 | Raghavan et al. | |
| 8,305,134 B2 | 11/2012 | Hirose et al. | |
| 8,334,705 B1 | 12/2012 | Gunnam et al. | |
| 8,635,467 B2 * | 1/2014 | Gunnam | G09C 1/00 |
| | | | 713/194 |
| 8,780,517 B2 | 7/2014 | Fukami | |
| 8,786,359 B2 * | 7/2014 | Bhuiyan | G05F 3/26 |
| | | | 323/317 |
| 9,678,525 B2 | 6/2017 | Demange et al. | |
| 9,787,171 B2 * | 10/2017 | Fort | H02M 1/08 |
| 9,891,639 B2 * | 2/2018 | Fort | G06F 21/755 |
| 10,054,973 B2 * | 8/2018 | Demange | G06K 19/0723 |
| 10,122,270 B2 * | 11/2018 | Nagda | G05F 3/30 |
| 11,037,522 B2 | 6/2021 | Naccari et al. | |
| 11,507,704 B2 * | 11/2022 | Nedovic | H02M 1/44 |
| 2005/0027471 A1 | 2/2005 | Vergnes | |
| 2005/0218872 A1 | 10/2005 | Wich | |
| 2006/0125463 A1 * | 6/2006 | Yen | G05F 3/262 |
| | | | 323/316 |
| 2006/0156039 A1 | 7/2006 | Deveaud et al. | |
| 2015/0001938 A1 | 1/2015 | Fort | |
| 2017/0192448 A1 | 7/2017 | Demange et al. | |
| 2021/0181778 A1 | 6/2021 | Fort et al. | |
| 2022/0066488 A1 | 3/2022 | Demange et al. | |
| 2022/0066494 A1 * | 3/2022 | Demange | G06F 21/755 |

FOREIGN PATENT DOCUMENTS

| | | |
|---|---|---|
| CN | 109656305 A | 4/2019 |
| EP | 0368727 A1 | 5/1990 |
| EP | 0523266 A1 | 1/1993 |
| FR | 2793904 A1 | 11/2000 |
| FR | 2857804 A1 | 1/2005 |
| FR | 3007857 A1 | 1/2015 |
| FR | 3042066 | 4/2017 |
| WO | 9966452 A1 | 12/1999 |
| WO | 2004027688 A2 | 4/2004 |

OTHER PUBLICATIONS

Vahedi, Haleh et al., "On-Chip Current Flattening Circuit with Dynamic Voltage Scaling", IEEE International Symposium on Circuits and Systems, May 21-24, 2006, 4 pages.

Das, Debayan et al., "EM and Power SCA-Resilient AES-256 Through >350X Current-Domain Signature Attenuation and Local Lower Metal Routing", IEEE Journal of Solid-State Circuits, vol. 56, No. 1, Jan. 2021, 15 pages.

Karagounis, Michael et al., "An Integrated Shunt-LDO Regulator for Serial Powered Systems", IEEE Proceedings of ESSCIRC, Greece, Sep. 14-18, 2009, 4 pages.

Li, Xuequn et al., "An Integrated Current Flattening Module for Embedded Cryptosystems", IEEE International Symposium on Circuits and Systems, May 23-26, 2005, Japan, 4 pages.

Mesquita, Daniel et al., "Current Mask Generation: a Transistor Level Security Against DPA Attacks," SBCCI'05, Brazil, ACM, Sep. 4-7, 2005, pp. 115-120.

Vahedi et al., "On-chip current flattening circuit with dynamic voltage scaling," School of Engineering, University of Guelph, Guelph, Canada, IEEE International Symposium on Circuits and Systems, 2006, pp. 4277-4280.

Serrano-Gotarredona, Teresa, "Voltage Clamping Current Mirrors with 13-decades Gain adjustment Range Suitable for Low Power MOS/Bipolar Current Mode Signal Processing Circuits," 1998 IEEE International Symposium on Circuits and Systems (ISCAS). vol. 1. IEEE, May 1998, 4 pages.

* cited by examiner

DEVICE AND METHOD FOR ELECTRONIC CIRCUIT POWER

CROSS-REFERENCE TO RELATED APPLICATIONS

This application claims the benefit of French Patent Application No. 2008675, filed on Aug. 25, 2020, which application is hereby incorporated herein by reference.

TECHNICAL FIELD

The present disclosure generally concerns electronic devices and methods, and, in particular, electronic circuit power supply devices and methods.

BACKGROUND

An electronic circuit may be integrated in an electronic chip. The chip typically comprises an electronic circuit power supply device having the function of delivering a voltage to the electronic circuit from a power supply voltage of the chip. The electronic circuit consumes a variable current according to its operation. The voltage delivered to the circuit is typically stabilized or regulated, so that it keeps a constant value during variations of the current consumed by the circuit.

The electronic circuit may contain confidential data, which may be protected against any access by a non-authorized person. This for example occurs when the chip is intended to receive, store, and/or communicate passwords or encryption data such as keys. An attacker may then attempt to obtain all or part of the confidential data.

In a type of attack, the attacker operates the chip and attempts to measure a current supplied to the electronic circuit power supply device, in order to, based on variations of this current, extract information relative to the operation of the electronic circuit enabling to deduce the confidential information.

SUMMARY

There is a need for a device and a method of power supply of an electronic circuit containing confidential data, enabling to protect the confidential data against attacks.

There is a need to simplify existing electronic circuit power supply devices and methods.

An embodiment overcomes all or part of the disadvantages of known electronic circuit power supply devices.

An embodiment overcomes all or part of the disadvantages of known electronic circuit power supply methods.

According to a first aspect, an embodiment provides a device for powering an electronic circuit, configured to flow, through a first conductor connected to a node, a first current that is an image of a second current consumed by the electronic circuit; flow a third current through a second conductor connected to the node, a first branch of a current mirror conducting the third current; flow a fourth constant current through a third conductor connected to the node; consume a fifth current that is an image of the third current; and regulate a potential of the node by acting on a gate potential of a transistor electrically in series with a second branch of the current mirror.

An embodiment provides a method of power supply of an electronic circuit, comprising steps of flowing, through a first conductor connected to a node, a first current that is an image of a second current consumed by the electronic circuit; flowing a third current through a second conductor connected to the node, a first branch of a current mirror conducting the third current; flowing a fourth constant current through a third conductor connected to the node; consuming a fifth current that is an image of the third current; and regulating a potential of the node by acting on a gate potential of a transistor electrically in series with a second branch of the current mirror.

According to an embodiment, the transistor couples a node of application of a potential, preferably fixed, to gates coupled together of transistors of the current mirror.

According to an embodiment, the transistor is smaller than a transistor of the second branch of the current mirror.

According to an embodiment, the potential of the node is regulated to a constant value.

According to an embodiment, a resistive element conducts the fourth current.

According to an embodiment, the constant value is that of a regulated potential for powering the electronic circuit.

According to an embodiment, a first branch of another current mirror conducts the first current; and the potential of the node is regulated to a potential value of a terminal of a second branch of the other current mirror.

According to an embodiment, an operational amplifier receives a potential difference between the node and the terminal of the second branch of the other current mirror and acts on the gate potential of the transistor.

According to an embodiment, the second branch of the other current mirror is electrically in series with the electronic circuit between a terminal of application of a power supply voltage referenced to a reference potential and a terminal of application of the reference potential.

According to an embodiment, the fifth current is supplied by the terminal of application of the power supply voltage.

According to an embodiment, a terminal of a second branch of the current mirror has a potential regulated to the value of the potential of the node.

According to an embodiment, an additional transistor is in series with the second branch of the current mirror; and the additional transistor is controlled by an output of an operational amplifier receiving a difference between the potential of the node and the potential of the terminal of the second branch of the current mirror.

According to an embodiment, a ratio between values of the fifth and third currents is equal to another ratio between values of the second and first currents or is equal to the sum of the other ratio and of unity.

An embodiment provides and electronic circuit comprising a device such as defined hereabove and the electronic circuit, or configured to implement a method such as defined hereabove.

According to a second aspect, an embodiment provides an electronic circuit power supply device, configured to flow, through a first conductor connected to a node, a first current that is an image of a second current consumed by the electronic circuit; flow a third current through a second conductor connected to the node; regulate a potential of the node to a constant value by acting on the third current; flow a fourth constant current through a third conductor connected to the node; and consume a fifth current that is an image of the third current.

An embodiment provides an electronic circuit power supply method, comprising steps of flowing, through a first conductor connected to a node, a first current that is an image of a second current consumed by the electronic circuit; flowing a third current through a second conductor connected to the node; regulating a potential of the node to a constant value by acting on the third current; flowing a fourth constant current through a third conductor connected to the node; and consuming a fifth current that is an image of the third current.

According to an embodiment, a resistive element conducts the fourth current.

According to an embodiment, the constant value is that of a regulated potential for powering the electronic circuit.

According to an embodiment, a first branch of a current mirror coupled to the first conductor conducts the first current; and a terminal of a second branch of the current mirror has a potential regulated to the constant value.

According to an embodiment, the second branch of the current mirror is electrically in series with the electronic circuit between a terminal of application of a power supply voltage referenced to the reference potential and a terminal of application of the reference potential.

According to an embodiment, the fifth current is supplied by the terminal of application of the power supply voltage.

According to an embodiment, a first branch of a current mirror coupled to the second conductor conducts the third current; a second branch of the current mirror coupled to the second conductor consumes the fifth current; and the potential of the node is regulated by an action on a potential of gates coupled together of transistors of the current mirror coupled to the second conductor.

According to an embodiment, the action on the potential of the gates is implemented by an operational amplifier receiving a potential difference between the node and the terminal of the second branch of the current mirror coupled to the first conductor.

According to an embodiment, the action on the potential of the gates is obtained by acting on a control potential of another transistor electrically in series with a second branch of the current mirror coupled to the second conductor; and preferably, the other transistor couples the gates to another node of application of a power supply potential.

According to an embodiment, the other transistor is smaller than a transistor of the second branch of the current mirror coupled to the second conductor.

According to an embodiment, a terminal of a second branch of the current mirror coupled to the second conductor has a potential regulated to the constant value.

According to an embodiment, an additional transistor is in series with the second branch of the current mirror coupled to the second conductor; and the additional transistor is controlled by an output of an operational amplifier configured to amplify a difference between the constant value and the potential of the terminal of the second branch of the current mirror coupled to the second conductor.

According to an embodiment, a ratio between values of the fifth and third currents is equal to another ratio between values of the second and first currents or is equal to the sum of the other ratio and of unity.

An embodiment provides an electronic chip comprising a device such as defined hereabove and the electronic circuit, or configured to implement a method such as defined hereabove.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, an electronic circuit powered by a power supply voltage is not described in detail, the described embodiments being compatible with usual electronic chip circuits.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Described embodiments comprise transistors of so-called metal-oxide-semiconductor, MOS, type. Although the term MOS type used to originally designate transistors having a metal gate and an oxide gate insulator, the MOS type now is, due to the development of this type of transistor, understood as encompassing field-effect transistors having a gate made of any electric conductor, and having a gate insulator made of any dielectric or electric insulator.

Figure 1:
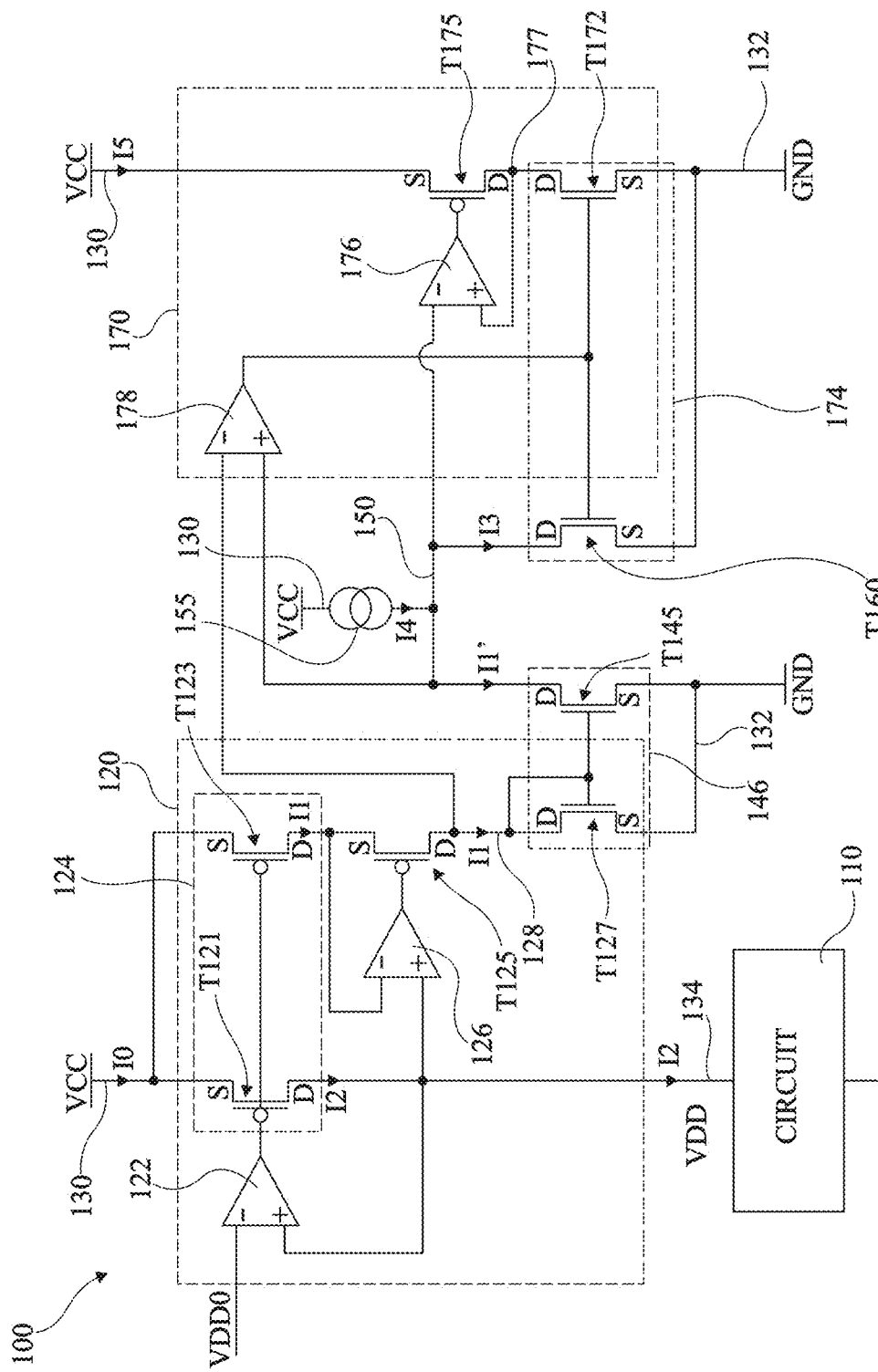
FIG. 1 schematically shows an example of an electronic circuit power supply device of the type to which the described embodiments apply.

FIG. 1 schematically shows an example of a power supply device 100 of an electronic circuit 110 (CIRCUIT), of a type to which the described embodiments apply.

Power supply device 100 and electronic circuit 110 are typically comprised within an electronic chip. The electronic chip may be formed of package, preferably tight, and of one or a plurality of wafer portions, preferably, semiconductor, having device 100 and circuit 110 formed inside and on top thereof. The package comprises areas of connection or pins of connection to other electronic circuits external to the circuit, for example, to a printed circuit board PCB. The electronic circuit may also be formed by a wafer portion, preferably semiconductor, having device 100 and circuit 110 located inside and on top thereof.

Circuit 110 may be any type of electronic chip circuit. Circuit 110 may comprise a plurality of sub-circuits powered in parallel by device 100. The electronic chip may further comprise other electronic circuits than circuit 110.

Device 100 comprises an assembly 120 electrically in series with electronic circuit 110 between a terminal or node 130 of application of a power supply voltage VCC referenced to a reference potential GND, for example, a ground; and a terminal or node 132 of application of reference potential GND.

The expression terminal of application of a voltage referenced to a reference potential means that this voltage is equal to a difference between a potential applied to this terminal and the reference potential. In other words, voltage VCC corresponds to the potential applied to terminal 130. Voltage VCC may be a voltage delivered to the electronic chip for its operation.

Typically, assembly 120 is located, with respect to circuit 110, on the side of terminal 130 of application of voltage VCC. For example, assembly 120 is connected or coupled to terminal 130. Further, assembly 120 may be coupled, preferably connected, to terminal 132 of application of reference potential GND.

Assembly 120 delivers to circuit 110, on a node 134 of connection between assembly 120 and circuit 110, a voltage VDD referenced to reference potential GND. In other words, voltage VDD referenced to reference potential GND, or potential VDD, is applied to node 134.

In the shown example, voltages VCC and VDD are positive. The chip power supply voltage VCC is typically in the range from 3.3 V to 5 V, and the voltage VDD delivered by assembly 120 is typically in the order of 1.2 V.

Assembly 120 may comprise a transistor T121, for example, of P-channel MOS type, coupling nodes 130 and 134. More particularly, transistor T121 has its conduction terminals coupled, preferably connected, to respective nodes 130 and 134. The expression conduction terminals of a transistor designates the terminals that the transistor electrically connects together in a conductive state and electrically insulates from each other in a non-conductive state. In the shown example, transistor T121 has a source terminal (S) coupled, preferably connected, to node 130, and a drain terminal (D) coupled, preferably connected, to node 134.

Assembly 120 may comprise an operational amplifier 122 controlling transistor T121. In other words, in the example where transistor T121 is of MOS type, transistor T121 has a gate coupled, preferably connected, to an output of operational amplifier 122. Operational amplifier 122 thus receives a difference between the voltage VDD delivered to electronic circuit 110 and a potential VDD0 having a constant value (that is, constant with respect to potential GND). More particularly, a non-inverting input (+) of operational amplifier 122 may be coupled, preferably connected, to node 134, and an inverting input (−) of operational amplifier 122 may be coupled, preferably connected, to a node of application of constant potential VDD0. Elements delivering potential VDD0 from voltage VCC are neither described nor shown, the embodiments being compatible with such usual elements.

In operation, operational amplifier 122 and transistor T121 regulate, that is, stabilize, the voltage VDD delivered to circuit 110 to a value equal to the constant value of potential VDD0. In other words, operational amplifier 122 acts on the control of transistor T121 to maintain the voltage VDD delivered to circuit 110 at the constant value of potential VDD0.

Assembly 120 may comprise a transistor T123 forming a current mirror 124 with transistor T121.

By "dimension ratio between the transistors", we mean the ratio between the width (W) and the length (L) of the gate of a transistor with respect to the ratio width over length of the gate of the other transistor.

Current mirror designates a circuit comprising two branches provided so that a current in one of the branches is an image of a current in the other one of the branches. Being images of each other means that the values of the currents have a constant ratio. Preferably, a current mirror comprises, more preferably is formed by, two MOS transistors having channels of the same conductivity type receiving a same control voltage. Control voltage means, in a MOS-type transistor, a voltage applied between the gate and the source of the transistor. The transistors of the current mirror are provided, as usual in a current mirror, so that currents flowing through transistors are, when the potentials of their drains are equal, by a constant ratio equal to dimension ratio of the transistors. Preferably, in a current mirror, the two transistors have their gates coupled together, more preferably connected together, and their sources coupled together, more preferably connected together. Preferably, in a current mirror, each transistor defines a branch of the current mirror. As a variant, the branches may comprise respective resistors having a predefined ratio of values.

Assembly 120 may comprise a transistor T125, for example, of P-channel MOS type. Transistor T125 for example has its source, coupled, preferably connected, to the drain of transistor T123. Transistor T125 is controlled by an operational amplifier 126. Operational amplifier 126 receives a potential difference between the drain terminals of transistors T121 and T123 of current mirror 124. More particularly, operational amplifier 126 receives, on an inverting input (−), the drain potential of transistor T123 and, on a non-inverting input (+), the drain potential of transistor T121.

In operation, the device consumes a current I0 supplied by node VCC. Amplifier 126 and transistor T125 regulate the drain potential of transistor T123 so that the potential of the drain of transistor T123 is equal to that of the drain of transistor T121. This enables to obtain, in transistor T123, a current I1 having a value by a constant ratio with a current I2 consumed by electronic circuit 110. In other words, current I1 is an image of current I2. Currents I1 and I2 verify equality I1=I2/K124, where K124 designates a constant and where the currents and their values are designated in the same way for simplification. Due to the fact that current I0 is the sum of currents I1 and I2, currents I0 and I1 then verify equality I1=I0/(K124+1), in other words, current I1 is also an image of current I0. As an example, constant K124 is in the range from 5 to 200, preferably equal to 100.

Assembly 120 may further comprise a transistor T127, for example, an N-channel MOS transistor. Transistor T127 has a drain terminal 128 connected or coupled, preferably by transistor T125, to the drain of transistor T123. The source of transistor T127 is coupled, preferably connected, to terminal 132 of application of reference potential GND. In other words, transistors T123, T127, and T125 are electrically in series between terminals 130 and 132. In particular, transistors T123, T125, and T127 conduct the same current I1. Transistor T127 has its gate and its drain coupled together, preferably connected together.

Device 100 comprises a node 150. Node 150 is coupled to terminal 132 of application of reference potential GND by a transistor T145. Transistor T145 may be of N-channel MOS type. In particular, transistor T145 has a drain terminal coupled, preferably connected, to node 150, and a source terminal coupled, preferably connected, to terminal 132.

N-channel transistors T127 and T145 form a current mirror 146. Drain terminal 128 and node 150 form the terminals of the respective branches of the current mirror.

In operation, the branch of the current mirror 146 formed by transistor T145 conducts a current I1' originating from node 150.

Device 100 further comprises a current source 155 coupling terminal 130 of application of voltage VCC to node 150. The current source delivers a constant current I4 to node 150.

Device 100 comprises a transistor T160 coupling node 150 to terminal 132 of application of the reference potential. Transistor T160 may be of N-channel MOS type, the drain of transistor T160 being coupled, preferably connected, to node 150, and the source of transistor T160 being coupled, preferably connected, to terminal 132.

Device 100 further comprises an assembly 170 controlling transistor T160. Assembly 170 couples terminals 130 of application of voltage VCC and 132 of application of reference potential GND. Assembly 170 receives a difference between the potentials of node 150 and of the drain terminal 128 of transistor T127. In other words, assembly 170 receives a difference between the potentials of the terminals of the branches of current mirror 146.

Assembly 170 comprises a transistor T172 forming, with transistor T160, a current mirror 174. Transistor T172 may be of N-channel MOS type. Transistor T172 may have its source coupled, preferably connected, to terminal 132 of application of reference potential GND. The drain of transistor T172 may be connected or coupled, preferably by a transistor T175, to terminal 130 of application of potential VCC. Transistor T175 is then in series, between terminals 130 and 132, with the branch of current mirror 174 formed by transistor T172.

Preferably, assembly 170 comprises an operational amplifier 176 controlling transistor T175. Operational amplifier 176 receives a difference between potentials of the drains of the transistors of current mirror 174, in other words, operational amplifier 176 is configured to amplify this difference. For example, transistor T175 is of P-channel MOS type, and operational amplifier 176 has an inverting input (−) coupled, preferably connected, to node 150, and a non-inverting input (+) coupled, preferably connected, to a node 177 of connection to each other of the drains of transistors T172 and T175. Node 177 defines a terminal of the branch of the current mirror 174 formed by transistor T172.

In operation, transistor T160 causes the flowing of a current I3 from node 150, in other, transistor T160 conducts current I3. Amplifier 176 and transistor T175 regulate the potential of terminal 177 to the value of the potential of node 150. As a result, transistor T172 conducts a current I5, which is an image of current I3 and is supplied by terminal 130 of application of potential VCC.

Device 100 further comprises an operational amplifier 178. Operational amplifier 178 receives a potential difference between node 150 and the drain terminal 128 of transistor T127. More particularly, operational amplifier 178 has an inverting input (−) coupled, preferably connected, to drain terminal 128 and a non-inverting input (+) coupled, preferably connected, to node 150. Operational amplifier 178 acts on the potential of the gates coupled together of transistors T160 and T172 of current mirror 174. In other words, the output of operational amplifier 178 is coupled, preferably connected, to the gates of transistors T160 and T172.

In operation, operational amplifier 178 regulates the potential of node 150 to a value equal to that of the potential of drain terminal 128, by acting on current I3. As a result, current I1' is the image of current I1 by current mirror 146. Due to the fact that current I1 is an image of currents I2 and I0, current I1' is an image of currents I0 and I2 and has with current I0 a value ratio 1/K, in other words, current I1' verifies relation I1'=I0/K. As an example, current mirror 146 has a current ratio equal to 1. Ratio 1/K may be equal to 1/(K124+1), for example, equal to 1/101.

Preferably, transistors T160 and T172 are provided so that current I5 has with current I3 a ratio K that is the inverse of ratio 1/K between current I1' and current I0. In other words, ratio K between the values of currents I5 and I3 is equal to the sum of unity 1 and of ratio K124 between the values of current I2 consumed by circuit 110 and I1' in transistor T145. Accordingly, the sum I0+I4+I5 of the currents I0, I4, and I5 supplied by terminal 130 remains constant, equal to a value (K+1)*I4, whatever the variations of the current I2 consumed by electronic circuit 110.

Thus, an attacker searching for variations of the current I0+I5 consumed by the electronic chip to deduce therefrom confidential data present in electronic circuit 110 would find no variation and could thus not achieve the attack. The electronic circuit is thus protected against such attacks.

According to a first aspect, embodiments of electronic circuit power supply devices and methods protecting the electronic circuit against the above-described attacks, provide, as compared with the example of the device 100 of FIG. 1, an improvement of the protection against attacks and/or faster variations of the current I2 supplied to the electronic circuit and/or a decrease in residual variations of the voltage VDD delivered to the circuit.

According to a second aspect, embodiments of electronic circuit power supply devices and methods protecting the electronic circuit against the above-described attacks provide, as compared with the example of the device 100 of FIG. 1, an easier implementation and/or a decreased number of components.

Figure 2:
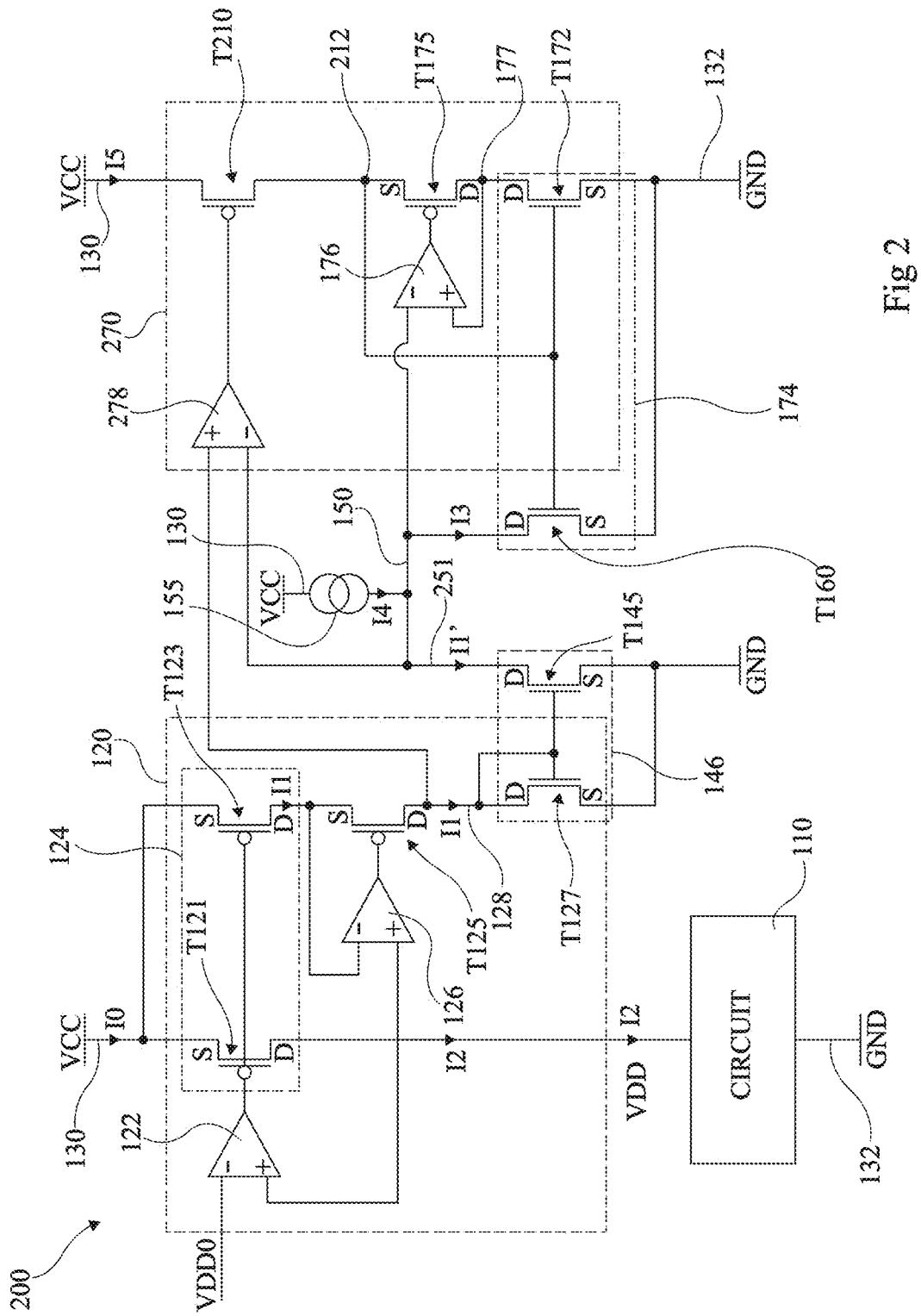
FIG. 2 schematically shows an embodiment of an electronic circuit power supply device according to a first aspect.

FIG. 2 schematically shows an embodiment of a device 200 for powering an electronic circuit 110 external to the device, according to the first aspect. Circuit 110 is of the type described hereabove in relation with FIG. 1. Device 200 and circuit 110 are preferably comprised within an electronic chip.

In the shown example, device 200 comprises elements identical or similar to those of the device 100 of FIG. 1, arranged identically or similarly. Such elements and their layout will not be described again in detail hereafter. Only the differences are highlighted.

Device 200 differs from the device 100 of FIG. 1 in that, in device 200, the assembly 170 of the device 100 of FIG. 1 is replaced with an assembly 270. Like the assembly 170 of the device 100 of FIG. 1, assembly 270 has the function of controlling transistor T160 to regulate the potential of node 150 by acting on current I3, and of consuming a current I5 that is an image of current I3. In the same way as in the device 100 of FIG. 1, the current I5 consumed by assembly 270 adds to the current I0 consumed by electronic circuit 110 and by assembly 120, so that the total current consumed by device 200 and circuit 110 remains constant during the operation of circuit 110. Device 200 thus protects circuit 110 against attacks.

The assembly 270 of device 200 differs from the assembly 170 of the device 100 of FIG. 1, in that assembly 270 comprises a transistor T210 electrically in series with the branch of current mirror 174 defined by transistor T172; the operational amplifier 178 of the assembly 170 of FIG. 1 is replaced with an operational amplifier 278. Operational amplifier 278 receives a potential difference between drain terminal 128 and node 150, and controls transistor T210; and a conduction terminal of transistor T210, located on the side of transistor T175, is coupled, preferably connected, to the gates of transistors T172 and T160 of current mirror 174. In other words, transistor T210 couples the gates of transistors T172 and T160 to node 130 of application of potential VCC. Potential VCC is preferably fixed, that is, constant with respect to potential GND.

In the shown example, transistor T210 is of P-channel MOS type. In this example, the source of transistor T210 is coupled, preferably connected, to node 130 of application of power supply potential VCC. In this example, amplifier 278 has a non-inverting input (+) coupled, preferably connected, to terminal 128, an inverting input (−) coupled, preferably connected, to node 150, and an output coupled, preferably connected, to the gate of transistor T210.

Preferably, transistor T175 couples together the drains of transistors T210 and T172, in other words, transistor T175 is in series with transistors T210 and T172 and is located between transistors T210 and T172.

In operation, amplifier 278 acts on the gate potential of transistor T210. Due to the fact that transistor T210 couples the gates of transistors T172 and T160 to node 130 of application of potential VCC, this results in an action on the potential of the gates coupled together of transistors T172 and T160 of current mirror 174. This acts on current I3, to regulate the potential of node 150 to the value of the potential of the drain terminal 128 of transistor T127. Transistor T160 is thus controlled to regulate the potential of node 150 by acting on current I3.

As compared with the device 100 of FIG. 1, the output of amplifier 278 thus controls the gate of transistor T172 via transistor T210. As mentioned hereabove, transistor T172 typically has dimensions greater than those of transistor T160, in other words, transistor T160 is smaller than transistor T172. For example, the dimension ratio of transistors T172 and T160 is in the range from approximately 50 to approximately 200, and is preferably equal to 101. In particular, transistor T210 is smaller than transistor T175.

Accordingly, transistor T172 has a relatively high stray gate capacitance as compared with that of transistor T210. Due to fact that the output of amplifier 278 controls transistor T172 via transistor T210, the control of transistor T172 by amplifier 278 is faster than the control of transistor T172 by amplifier 178 of the device 100 of FIG. 1.

As a result, as compared with the device 100 of FIG. 1, the current I5 consumed by device 200 more rapidly follows the variations of the current I2 consumed by circuit 110.

Due to the fact that transistor T210 is in series with transistor T172, during a variation of current I2 transiently causing a difference between the potentials of node 150 and of the drain of transistor T172, amplifier 278, and transistor T210 act on the drain potential of transistor T172 to compensate for this difference faster than in a circuit such as the assembly 170 of the device of FIG. 1. In the shown example, if the potential of node 150 transiently increases, transistor T210 becomes more conductive, which contributes to increasing the drain potential of transistor T172. In the shown example, if the potential of node 150 transiently decreases, transistor T210 becomes less conductive, which contributes to decreasing the drain potential of transistor T172. This contributes to having the variations of current I2 followed by current I5 more rapidly than in a power supply device where the potential of the gates of transistors T160 and T172 would be controlled via a transistor that is not located in series with transistor T172.

The fact for current I5 to more rapidly follow the variations of current I2 decreases the duration and the amplitude of transient residual variations of the current consumed by the chip at times when current I2 changes value. This enables, for a same rapidity of the changes of value of current I2, to decrease a risk for an attacker to transiently detect such residual variations of the current consumed by the chip. The protection against attacks is thus improved. This also enables, for a given protection level, that is, a given level of residual variations of the current consumed by the chip, the current I2 consumed by electronic circuit 110 to vary more rapidly. Electronic circuit 110 may thus be faster and/or, by increasing the rapidity of operational amplifier 122, a more stable voltage VDD may be provided to circuit 110.

The embodiments according to the first aspect are not limited to the specific above-described example. In device 200, assembly 120 may be replaced with any circuit configured to control transistor T145; and deliver a value of the potential of node 150 for which the current I1' in transistor T145 is an image of the current I2 consumed by circuit 110.

Figure 4:
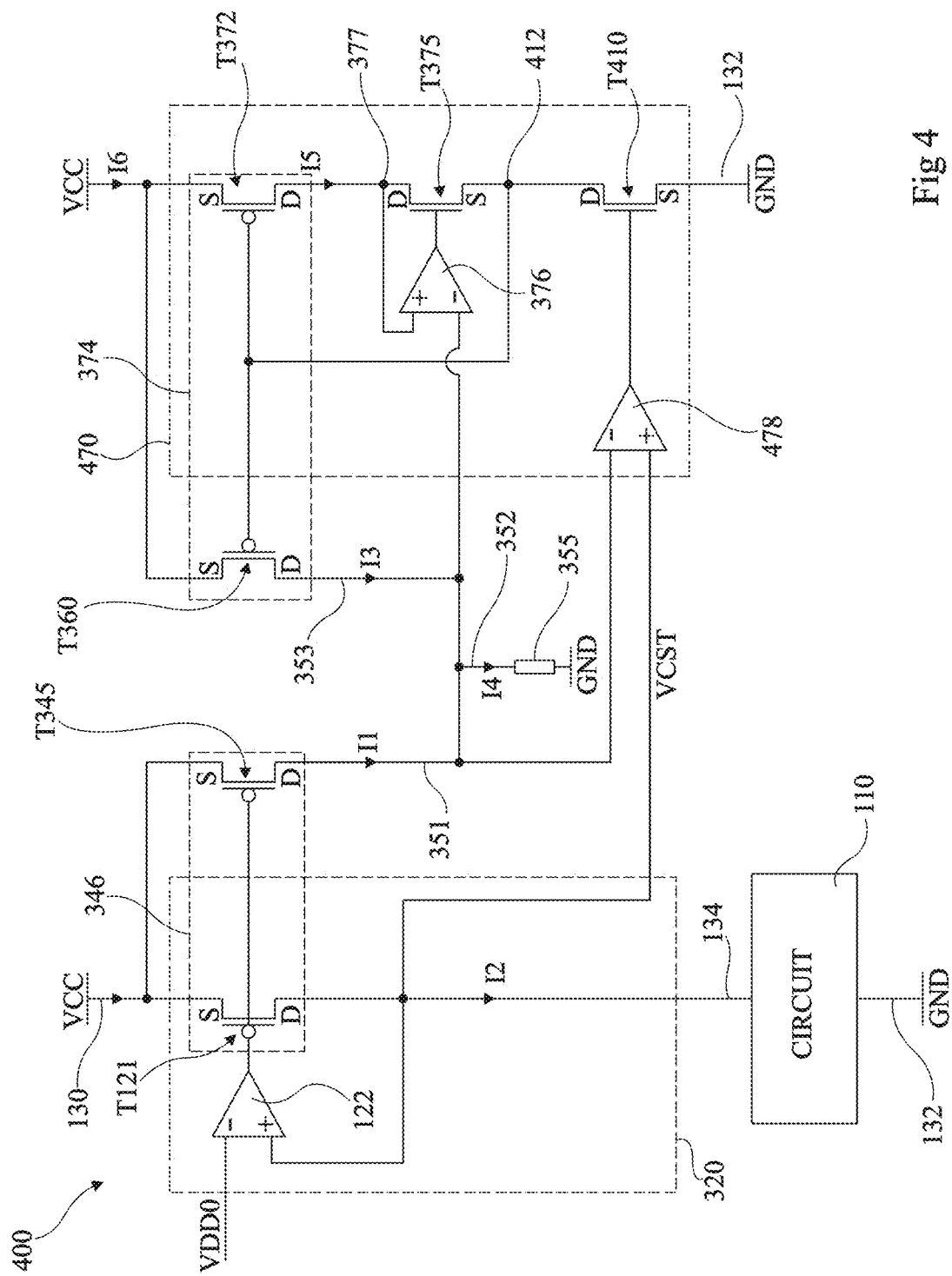
FIG. 4 schematically shows an embodiment of an electronic circuit power supply device combining the first and second aspects.

In particular, instead of transistor T145 coupling node 150 to terminal 132 of application of the reference potential, a transistor coupling node 150 to terminal 130 of application of voltage VCC may be provided, as described hereafter in relation with FIG. 4. Current I1' flowing through a conductor 251 connected to node 150 is replaced with a current flowing through a conductor connected to node 150 towards node 150.

Assembly 120 and transistor T145 may thus be replaced with any circuit configured to flow a current through a conductor connected to node 150, and to deliver a value of the potential of node 150 for which the current is an image of the current I2 consumed by circuit 110.

Figure 3:
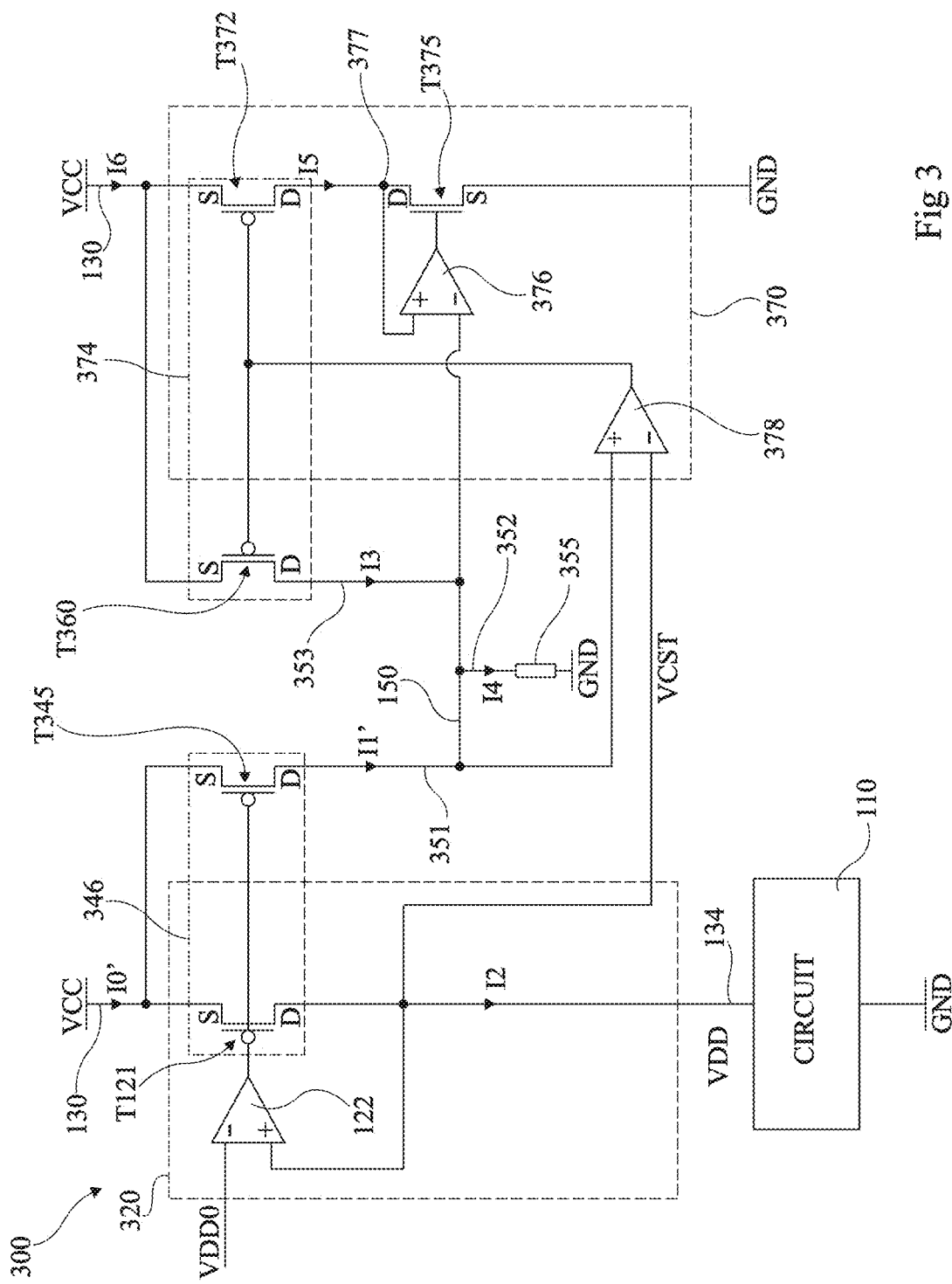
FIG. 3 schematically shows an embodiment of an electronic circuit power supply device according to a second aspect.

FIG. 3 schematically shows an embodiment of a power supply device 300 of an electronic circuit 110 external to device 300, according to a second aspect. Circuit 110 is of the type described hereabove in relation with FIG. 1. Device 300 and circuit 110 are preferably comprised within an electronic chip. Device 300 comprises elements identical or similar to those of the device 100 of FIG. 1, which are not described in detail again.

Device 300 comprises an assembly 320 electrically in series with electronic circuit no between terminal 130 of application of voltage VCC and terminal 132 of application of reference potential GND. Preferably, assembly 320 is located, with respect to circuit 110, on the side of terminal 130 of application of potential VCC. For example, assembly 320 is connected to terminal 130. Further, assembly 320 may be coupled, preferably connected, to terminal 132 of application of reference potential GND. Assembly 320 delivers voltage VDD to circuit 110 on the node 134 defined by the drain terminal of transistor T121.

Assembly 320 comprises a transistor T121 and an operational amplifier 122, identical or similar to those of the device 100 of FIG. 1, arranged identically or similarly. In the same way as in the device 100 of FIG. 1, operational amplifier 122 and transistor T121 regulate the voltage VDD delivered to circuit 110.

Device 300 comprises a node 150 coupled to terminal 130 of application of voltage VCC by a transistor T345. Transistor T345 may be of P-channel MOS type. In particular, transistor T345 has a drain terminal coupled, preferably connected, to node 150, and a source terminal coupled, preferably connected, to terminal 130.

P-channel transistors T121 and T345 form a current mirror 346. The drain terminal 134 of transistor T121 and node 150 form the terminals of the respective branches of current mirror 346. Preferably, the sources of transistors T121 and T345 are coupled together, more preferably connected together, and the gates of transistors T121 and T345 are coupled together, more preferably connected together. The branch of current mirror 346 formed by transistor T121 is electrically in series with electronic circuit 110 between terminal 130 of application of the referenced power supply voltage VCC and terminal 132 of application of reference potential GND.

In operation, the branch of current mirror 346 formed by transistor T345 flows a current I1' directed towards node 150 through a conductor 351 connected to node 150 and coupled to current mirror 346.

Device 300 further comprises a resistive element 355 coupling node 150 to terminal 132 of application of reference potential GND. Resistive element 355 samples a current I4 from node 150. In other words, resistive element 355 flows current I4 through a conductor 352 connected to node 150. Resistive element 355 may be formed of a resistor or of a plurality of resistors in series and/or in parallel.

Device 300 comprises a transistor T360 coupling node 150 to terminal 130 of application of voltage VCC. Transistor T360 may be of P-channel MOS type, the drain of transistor T360 being coupled, preferably connected, to node 150, and the source of transistor T360 being coupled, preferably connected, to terminal 130.

Device 300 further comprises an assembly 370. Assembly 370 couples the terminals 130 of application of voltage VCC and 132 of application of reference voltage GND. Assembly 370 receives a difference between the potentials of the terminals of the branches of current mirror 146 (formed by nodes 150 and 134).

Assembly 370 comprises a transistor T372 forming, with transistor T360, a current mirror 374. Transistor T372 may be of P-channel MOS type. Transistor T372 may have its source coupled, preferably connected, to terminal 130 of application of voltage VCC. The drain of transistor T372 may be connected or coupled, preferably, by a transistor T375, to the terminal 132 of application of the reference potential. Transistor T375 is then in series, between terminals 130 and 132, with the transistor T372 of current mirror 374.

Preferably, assembly 370 comprises an operational amplifier 376 controlling transistor T375 and receiving a difference between the drain potentials of the transistors of current mirror 374. For example, the transistor is of N-channel MOS type, and operational amplifier 376 has an inverting input (−) coupled, preferably connected, to node 150 and a non-inverting input (+) coupled, preferably connected, to a node 377 of connection to one another of the drains of transistors T372 and T375. Node 377 forms a terminal of the branch of current mirror 374 defined by transistor T372.

In other words, the current mirror 374, the transistor T375, and the amplifier 376 of device 300 correspond, respectively, to the current mirror 174, to the transistor T175, and to the amplifier 176 of the device 100 of FIG. 1, where the voltage signs have been exchanged, the N and P types of the channels of the transistors have been exchanged, and terminals 130 and 132 have been exchanged.

The operation is thus similar to that described in relation with FIG. 1. Transistor T360 flows a current I3 flowing towards node 150 through a conductor 353 connected to node 150 and coupled to current mirror 374. Amplifier 376 and transistor T375 regulate the potential of terminal 377 to the value of the potential of node 150. The branch of current mirror 374 formed by transistor T372 consumes a current I5, which is an image of current I3, supplied by terminal 130 of application of potential VCC.

Device 300 further comprises an operational amplifier 378. Operational amplifier 378 receives a potential difference between the potential of node 150 and a constant value VCST. More particularly, operational amplifier 378 has a non-inverting input (+) coupled, preferably connected, to node 150 and an inverting input (−) receiving a potential having constant value VCST. The output of operational amplifier 378 is coupled, preferably connected, to the gates of transistors T360 and T372. Thus, operational amplifier 378 acts on the potential of the gates coupled together of the transistors T360 and T372 of current mirror 374.

In operation, operational amplifier 378 regulates the potential of node 150 to constant value VCST by acting on current I3.

Due to the fact that the potential of node 150 is regulated to a constant value, current I4 is constant. As compared with the device 100 of FIG. 1, constant current I4 has been more simply obtained, by replacing current source 155, provided to supply a current remaining constant when the voltage varies across the current source, by a simple resistive element.

According to an embodiment, constant value VCST is that of regulated voltage VDD. In the shown example, the non-inverting input of amplifier 378 is coupled, preferably connected, to the node 134 of application of voltage VDD. In another example, not shown, the non-inverting input of amplifier 378 is coupled or connected to a node of a potential having a same value as voltage VDD, such as potential VDD0, this node for example being the non-inverting input of amplifier 122.

Due to the fact that constant value VCST, having the potential of node 150 is regulated thereon, is equal to the value of voltage VDD, the current I1 flow by current mirror 346 through conductor 351 is an image of the current I2 consumed by electronic circuit 110. Current I1 thus is an image of a current I0' supplied by terminal 132, current I0' being the sum of currents I1' and I2. More particularly, current I1' verifies relation I1'=I0'/(K346+1), where K346 is a ratio between currents I2 and I1'. In other words, current I1 verifies relation I1'=I0'/K', with K'=K346+1. Value K' may be in the range from 50 to 200, for example, equal to 101.

Current I1', which is an image of current I0', has thus been flow through conductor 351 connected to node 150 without the use of components such as transistors T123, T125, and T127 of the device 100 of FIG. 1. Device 300 is thus simpler to form and comprises fewer components than a device such as the device 100 of FIG. 1.

Transistors T360 and T372 are provided so that currents I5 and I3 have a ratio of values equal to constant K346. In other words, the ratio between currents I5 and I3 is the same as that between currents I2 and I1'. As a result, a current I6 supplied by terminal 130, which is the sum of currents I3 and I5, has with current I3 a ratio K that is the inverse of ratio 1/K of current I1' and of current I0'. Accordingly, the sum I0'+I6 of the currents I0 and I6 supplied by current 130 remains constant, equal to K*I4, whatever the variations of the current I2 consumed by electronic circuit 110. As a result, circuit 110 is protected against the above-described attacks.

The embodiments according to the second aspect are not limited to the specific example described hereabove. In device 300, assembly 370 may be replaced with any circuit configured to control transistor T360 to regulate the potential of node 150 to constant value VCST; and consume a current I5 that is an image of the current I3 flowing through transistor T360, that is, flow current I5, that is the image of current I3, from one of terminals 130 and 132 to the other one of terminals 130 and 132.

Preferably, the circuit replacing assembly 370 comprises a transistor forming a current mirror with transistor T360, transistor T360 forming a branch of the current mirror. Another branch of the current mirror consumes current I5. In this other branch, a potential of a drain terminal is regulated to constant value VCST, so that the two drain terminals of the current mirror have the same potential. Thus, in variants, the inverting input of amplifier 376 is not connected or coupled to node 150, but is connected or coupled to another node having a potential equal or regulated to constant value VCST, such as the nodes 134 for supplying voltage VDD and the inverting input of amplifier 122.

Further, assembly 320 may be replaced with any circuit configured to control transistor T345 to flow, through transistor T345, a current I1' that is an image of current I2 when the voltage across transistor T345 has constant value VCST. Preferably, such a circuit replacing assembly 320 comprises a transistor forming a current mirror with transistor T345, transistor T345 forming a branch of the current mirror. In another branch of the current mirror, a potential of a drain terminal is regulated to constant value VCST, so that the two drain terminals of the current mirror have the same potential.

In particular, instead of transistor T345 coupling node 150 to terminal 130 of application of potential VCC, a transistor such as transistor T145 (FIG. 1), coupling node 150 to terminal 132 of application of reference potential GND, may be provided. In the same way as transistor T345, transistor T145 flows a current through a conductor connected to node 150. Thus, an embodiment comprises the same elements as those of the device 100 of FIG. 1, with the difference that amplifier 178 (FIG. 1) receives constant value VCST on its inverting input; elements enabling to regulate the voltage of the drain terminal 128 of transistor T127 to constant value VCST are provided, in series with transistors T127 and T125; and preferably, current source 155 is formed by a resistive element, which enables to simplify current source 155.

Assembly 320 and transistor T145 may thus be replaced with any circuit configured to flow a current through a given conductor connected to node 150 when the potential of node 150 has constant value VCST.

Further, resistive element 355 may be replaced with any current source enabling to obtain constant current I4 when the voltage across the current source has constant value VCST. In particular, resistive element 355 is not necessary to benefit from the above-mentioned advantage of not using components such as transistors T123, T125, and T127 (FIG. 1).

FIG. 4 schematically shows an embodiment of a device 400 for powering an electronic device 110 combining the first and second aspects. Circuit 110 is of the type described hereabove in relation with FIG. 1. Device 400 and circuit 110 are preferably comprised within an electronic chip.

In the shown example, device 400 comprises elements identical or similar to those of the device 300 of FIG. 3, arranged identically or similarly. These elements and their layout will not be described again in detail hereafter. Only the differences are highlighted.

Device 400 differs from the device 300 of FIG. 3 in that, in device 400, the assembly 370 of device 300 is replaced with an assembly 470. Like the assembly 370 of device 300, assembly 470 has the functions of controlling transistor T360 to regulate the potential of node 150 by acting on current I3, and of consuming a current I5 that is an image of current I3. Device 400 thus protects circuit 110 against attacks.

The assembly 470 of device 400 differs from the assembly 370 of the device 300 of FIG. 3, in that assembly 370 comprises a transistor T410 electrically in series with transistor T372; the operational amplifier 378 of the assembly of FIG. 3 is replaced with an operational amplifier 478. Operational amplifier 478 receives a difference between constant value VCST and the potential of node 150, and controls transistor T410; and a conduction terminal 412 of transistor T410, located on the side of transistor T375, is coupled, preferably connected, to the gates of transistors T372 and T360 of current mirror 374.

In the shown example, transistor T410 is of N-channel MOS type. In this example, the source of transistor T410 is coupled, preferably connected, to the terminal 132 of application of reference potential GND. In this example, amplifier 478 has a non-inverting input (+) coupled, preferably connected, to node 134 or to a node of application of a potential equal to, or regulated to, the constant value; an inverting input (−) coupled, preferably connected, to node 150; and an output coupled, preferably connected, to the gate of transistor T410. In other words, transistor T410 couples the gates of transistors T372 and T360 to the node 132 of application of fixed potential GND.

In operation, amplifier 478 acts on the gate potential of transistor T410. This results in an action on current I3 in transistor T360, to regulate the potential of node 150 to constant value VCST. Transistor T360 is thus controlled to regulate the potential of node 150 by acting on current I3.

As compared with the device 300 of FIG. 3, in device 400, the output of amplifier 478 thus controls the gate of transistor T372 via transistor T410. Transistor T410 is smaller than transistor T372. In the same way as for the device 200 of FIG. 2, the control of transistor T372 by amplifier 478 is faster than the control of transistor T372 by the amplifier 378 of the device 300 of FIG. 3.

In the same way as for the device 200 of FIG. 2, in device 400, as compared with the device 300 of FIG. 3, due to the fact that the control of transistor T372 is faster and due to the fact that transistor T410 is in series with transistor T372, the current I5 consumed by device 400 more rapidly follows the variations of the current I2 consumed by circuit 110. This provides, as compared with the device 300 of FIG. 3, an improvement of the protection against attacks and/or faster variations of the current I2 supplied to the electronic circuit and/or a decrease in residual variations of the voltage VDD delivered to the circuit.

Various embodiments and variants have been described. Those skilled in the art will understand that certain features of these embodiments can be combined and other variants will readily occur to those skilled in the art. In particular, although positive voltages VCC and VDD have been described hereabove, it will be within the abilities of those skilled in the art to adapt the above-described embodiments to negative voltages VCC and/or VDD, for example, by exchanging the N and P channel conductivity types of the transistors, by exchanging the inverting and non-inverting inputs of the operational amplifiers, and by inverting the directions of the currents.

Further, embodiments have been described, where transistors are controlled by operational amplifiers. It will be within the abilities of those skilled in the art, according to power supply voltages of the amplifiers and to properties of the amplifiers and of the transistors, to implement embodiments where the N and P channel conductivity types of one or a plurality of the transistors are exchanged, the inverting and non-inverting inputs of the concerned amplifier(s) being exchanged.

Finally, the practical implementation of the described embodiments and variants is within the abilities of those skilled in the art based on the functional indications given hereabove.

What is claimed is:

1. A device for powering an electronic circuit, the device comprising:
a first transistor having a drain terminal coupled to a node, a first current flowing at the drain terminal of the first transistor;
a second transistor having a drain terminal coupled to the electronic circuit, a second current flowing at the drain terminal of the second transistor that is an image of the first current, a control terminal of the first transistor coupled to a control terminal of the second transistor;
a third transistor having a drain terminal coupled to the node, a third current flowing at the drain terminal of the third transistor;
a resistive element coupled to the node, a fourth constant current flowing through the resistive element;
a fourth transistor having a control terminal coupled to a control terminal of the third transistor, a fifth current flowing at a drain terminal of the fourth transistor that is an image of the third current; and
a fifth transistor configured to regulate a potential of the node by acting on a control terminal of the fifth transistor electrically in series with the drain terminal of the fourth transistor.

2. The device according to claim 1, wherein a source terminal of the fifth transistor is coupled to a reference node, and a drain terminal of the fifth transistor coupled to the control terminal of the third transistor and the control terminal of the fourth transistor.

3. The device according to claim 1, wherein the fifth transistor is smaller than the fourth transistor.

4. The device according to claim 1, wherein the potential of the node is regulated to a constant value.

5. The device according to claim 4, wherein the constant value is that of a regulated potential for powering the electronic circuit.

6. The device according to claim 1, wherein the potential of the node is regulated to a potential value of the drain terminal of the second transistor.

7. The device according to claim 1, further comprising an operational amplifier configured to:
receive a potential difference between the node and the drain terminal of the second transistor; and
act on the control terminal of the fifth transistor.

8. The device according to claim 1, wherein a source terminal of the second transistor is coupled to a power supply voltage, and wherein the electronic circuit is coupled to a reference potential.

9. The device according to claim 8, wherein a source terminal of the fifth transistor is coupled to the power supply voltage.

10. The device according to claim 1, wherein the drain terminal of the fourth transistor has a potential regulated to the potential of the node.

11. The device according to claim 1, further comprising:
a sixth transistor having a drain terminal coupled to the drain terminal of the fourth transistor, a source terminal of the sixth transistor coupled to a drain terminal of the fifth transistor; and
an operational amplifier coupled to the control terminal of the sixth transistor, the operational amplifier configured to receive a difference between the potential of the node and the potential of the drain terminal of the fifth transistor.

12. The device according to claim 1, wherein a first ratio between values of the fifth and third currents is equal to a second ratio between values of the second and first currents or equal to a sum of the second ratio and unity.

13. A method of supplying power to an electronic circuit, the method comprising:
flowing, through a drain terminal of a first transistor coupled to a node, a first current;
flowing a second current at a drain terminal of a second transistor coupled to the electronic circuit, the second current being an image of the first current, a control terminal of the first transistor coupled to a control terminal of the second transistor;
flowing a third current through a drain terminal of a third transistor coupled to the node;
flowing a fourth constant current through a resistive element coupled to the node;
flowing a fifth current that is an image of the third current at a drain terminal of a fourth transistor, the fourth transistor having a control terminal coupled to a control terminal of the third transistor; and
regulating, by a fifth transistor, a potential of the node by acting on a control terminal of the fifth transistor, the fifth transistor being electrically in series with the drain terminal of the fourth transistor.

14. The method according to claim 13, further comprising regulating the potential of the node to a constant value.

15. The method according to claim 13, further comprising:
regulating the potential of the node to a potential value of the drain terminal of the second transistor.

16. The method according to claim 15, further comprising:
receiving, by an operational amplifier, a potential difference between the node and the drain terminal of the second transistor; and
acting, by the operational amplifier, on the control terminal of the fifth transistor.

17. The method according to claim 13, wherein a first ratio between values of the fifth and third currents is equal to a second ratio between values of the second and first currents or equal to a sum of the second ratio and unity.

18. An electronic chip comprising:
an electronic circuit; and
a device configured to power the electronic circuit, the device comprising:
a first transistor having a drain terminal coupled to a node, a first current flowing at the drain terminal of the first transistor;
a second transistor having a drain terminal coupled to the electronic circuit, a second current flowing at the drain terminal of the second transistor that is an image of the first current, a control terminal of the first transistor coupled to a control terminal of the second transistor;
a third transistor having a drain terminal coupled to the node, a third current flowing at the drain terminal of the third transistor;
a resistive element coupled to the node, a fourth constant current flowing through the resistive element;
a fourth transistor having a control terminal coupled to a control terminal of the third transistor, a fifth current flowing at a drain terminal of the fourth transistor that is an image of the third current; and a fifth transistor configured to regulate a potential of the node by acting on a control terminal of the fifth transistor electrically in series with the drain terminal of the fourth transistor.

19. The electronic chip of claim 18, wherein the device further comprises:

a sixth transistor having a drain terminal coupled to the drain terminal of the fourth transistor, a source terminal of the sixth transistor coupled to a drain terminal of the fifth transistor; and an operational amplifier coupled to the control terminal of the sixth transistor, the operational amplifier configured to receive a difference between the potential of the node and the potential of the drain terminal of the fifth transistor.

20. The electronic chip of claim 18, wherein the device further comprises an operational amplifier configured to:

receive a potential difference between the node and the drain terminal of the second transistor; and act on the control terminal of the fifth transistor.

* * * * *